United States Patent Office 2,940,554
Patented June 14, 1960

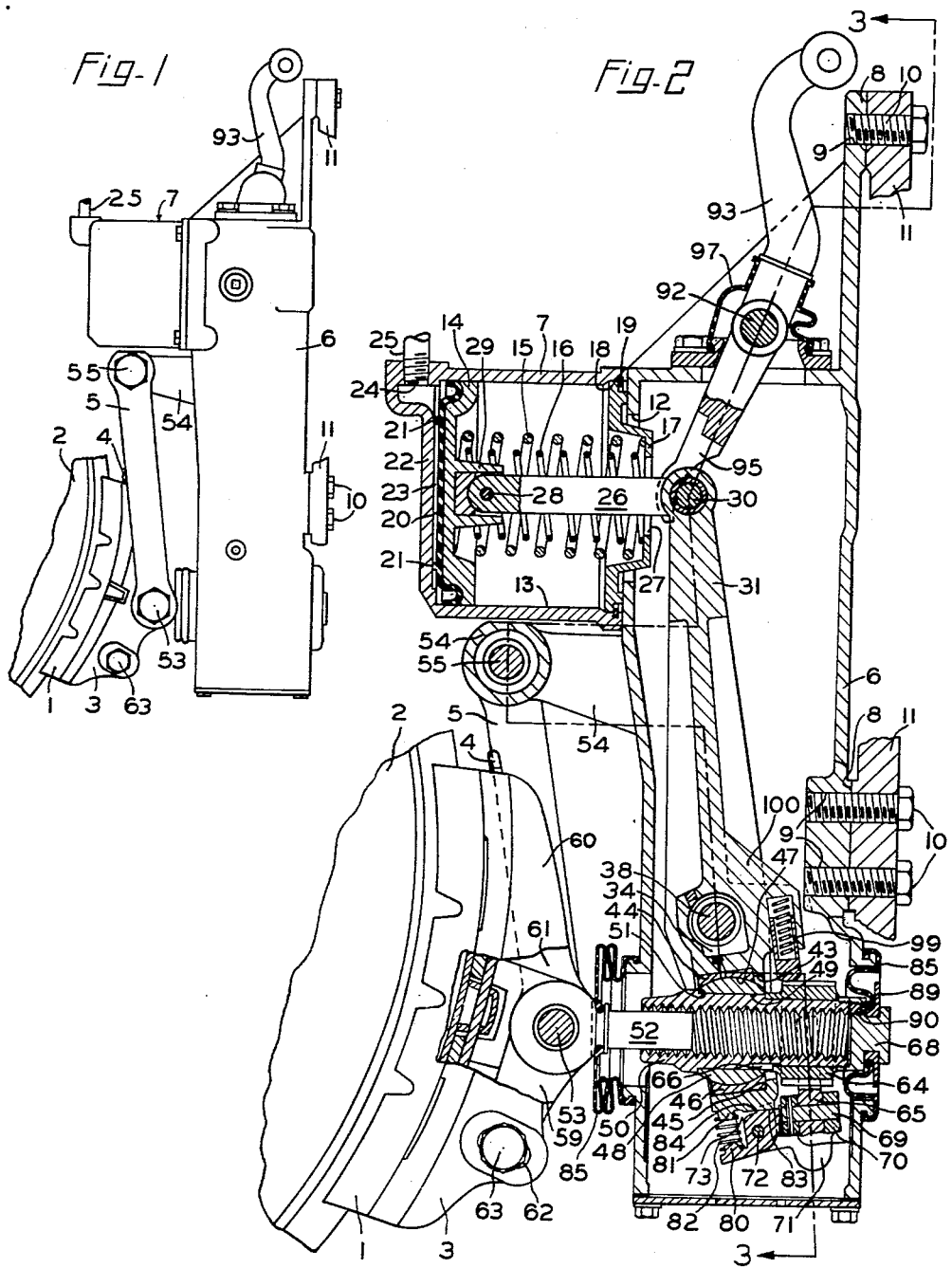

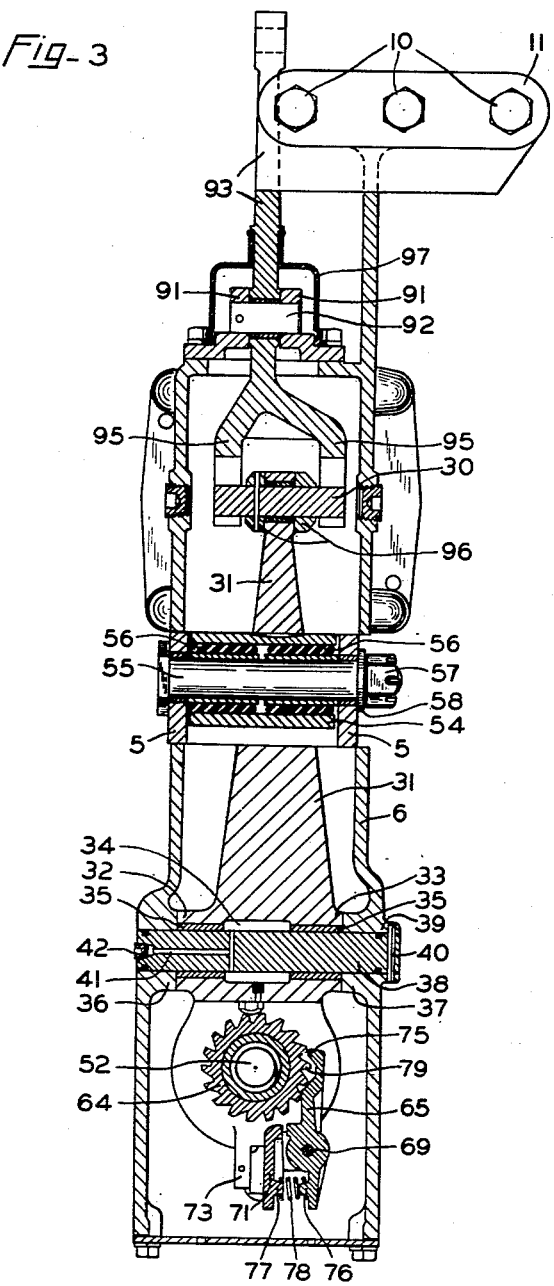

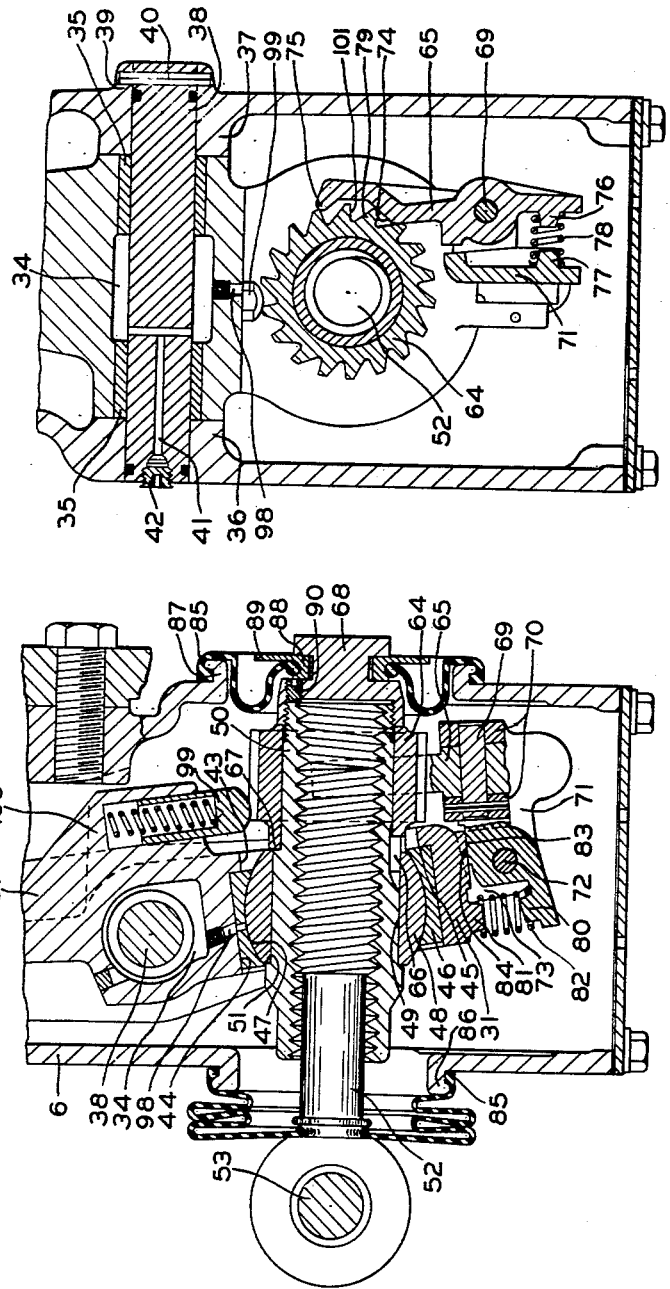

2,940,554

RAILWAY WHEEL TREAD BRAKE UNIT

Mortimer B. Cameron, Pittsburgh, Pa., assignor to Westinghouse Air Brake Company, Wilmerding, Pa., a corporation of Pennsylvania Filed Dec. 23, 1958, Ser. No. 782,591

12 Claims. (Cl. 188—153)

This invention relates to tread brake apparatus for railway rolling stock and more particularly to so-called "package" brake units wherein most of the actuating mechanism is enclosed in a unitary sectionalized casing or "package" to protect it against dirt, ice and water.

Until recently conventional brake riggings for railway cars consisted of one or more brake cylinders carried on the underside of the car body and having the piston rods thereof connected through rods and levers to the brake shoes, independently hung on brake shoe hangers from the truck frame, to effect movement of all of the brake shoes on the car into and out of contact with the tread of the car truck wheels.

The conventional type of brake rigging cannot conveniently be employed on certain new type cars, such as the new lightweight cars, due to limitations of space and weight requirements. Consequently, more recently there has been proposed for use on railway cars, such as subway cars, a brake rigging of the "package" brake unit type wherein a brake unit is provided for each individual wheel on the car. A brake unit of this type is described and claimed in the copending patent application, Serial No. 750,704, filed July 24, 1958, of Glenn T. McClure, Thomas F. Hursen and George K. Newell, and assigned to the assignee of this application.

Brake units of the "package" type, as described in the hereinbefore-mentioned copending patent application, does not permit the brake shoes to move sufficiently sidewise or laterally to follow the tread surface of the truck wheels as a wheel and axle unit shifts laterally in the supporting truck journal boxes due to variance in the distance between the rails on which the passenger car is traveling and/or the shifting of the weight of the car as the result of the action of the centrifugal force created as the car travels around a curve. Therefore, the lateral shifting of the wheels with respect to the brake shoes would result in abnormally high stresses in and undue wear on the wheel flanges as well as uneven wear on the wheel treads, thereby reducing the time between wheel turnings and consequently the ultimate length of life of the wheels.

The general purpose of this invention is to provide a novel brake unit having means for permitting the brake shoe to shift sidewise or laterally and follow the tread surface of its respective car wheel as a wheel and axle unit moves laterally within opposite journal boxes incidental to travel of the car along the track.

This invention comprises a novel "package" type brake unit in which a flexible connection is provided between a power actuated brake lever and a brake shoe actuating rod, which connection is in the form of a universal joint which permits lateral rocking movement of the brake shoe actuating rod whereby the brake shoe may shift simultaneously with its respective wheel as the wheel and axle unit shifts in the journal boxes in which the unit is mounted. A resilient pivotal support is further provided for the brake shoe hanger to permit such lateral shifting of the brake shoe. A novel slack adjuster mechanism is also provided between the brake lever and brake shoe actuating rod for compensating for brake shoe wear in response to more than a chosen degree of angular rocking of the brake lever.

In the accompanying drawings:

Fig. 1 is a side elevational view of a brake unit embodying the invention, showing the manner by which the unit is mounted on a railway passenger car truck.

Fig. 2 is a vertical cross-sectional view of the brake unit showing the brake applying linkage containing a universal joint therein and the slack adjuster mechanism.

Fig. 3 is a cross-sectional view, taken along the line 3—3 of the brake unit of Fig. 2 and looking in the direction of the arrows, showing further structural details.

Fig. 4 is a fragmentary enlarged sectional view showing certain details of the universal joint and slack adjuster mechanism of Fig. 2.

Fig. 5 is a fragmentary enlarged sectional view, showing certain details of the pawl and ratchet wheel of Fig. 3.

*Description*

As shown in Fig. 1 of the drawings, a pneumatic brake unit, one of which is provided for each wheel of a railway passenger car truck, is secured, as by several bolts and nuts, to a pair of bosses formed integral with the center sill of the truck frame.

As shown in detail in Fig. 2, the brake unit comprises a brake shoe 1 for movement into braking contact with the tread of a wheel 2 of the car truck, a brake head 3 to which the brake shoe 1 is secured, as by a key 4, an external brake head hanger 5, and a sectionalized casing comprising a main section 6 and a brake cylinder section 7.

Formed integral with the main casing section 6 is a pair of bosses 8 provided with several spaced-apart threaded bores 9 for receiving a like number of cap screws 10 whereby the main section 6 is rigidly secured to a pair of angle brackets 11 attached as by welding to a center sill (not shown) of a passenger car truck frame.

The brake cylinder casing section 7 is cylindrical in form and separably secured, as by cap screws (not shown), to one side of the main section 6 in registry with an opening 12 in the side wall of the main casing section 6. Slidably operable in a bore 13 in the casing section 7 is a fluid pressure actuated brake applying piston 14.

A pair of concentrically arranged release springs 15 and 16 are interposed between the piston 14 and a dish-shaped non-pressure head 17 that is secured in a counterbore 18 at the inner end of the casing section 7, as by a snap ring 18, and serves to yieldingly bias the piston 14 and, through a linkage to be hereinafter described, the brake shoe 1 in a brake releasing direction to a brake release position in which position they are shown in Fig. 2.

A packing cup 20 of the snap-on type is secured to the pressure face of piston 14, and has several lugs 21 thereon which, when piston 14 occupies its brake release position in which position it is shown in Fig. 2, contact a pressure head 22 which closes the left-hand end of casing section 7. A pressure chamber 23 is thus formed between the pressure head 22 and piston 14 to which fluid under pressure may be supplied through a port 24 and a pipe 25. Pipe 25 may be connected to the brake cylinder pipe of a brake control valve of the usual air brake system on railway passenger cars.

A piston rod 26 that extends through an opening 27 in the non-pressure head 17 into the chamber formed inside the main casing section 6, is pivotally connected at one end, as by a pin 28, to a central boss or sleeve 29 formed at one side of and integral with the piston 14, and at the other end, as by a pin 30, to a brake lever 31 adjacent one end of the lever. The brake lever 31 is tapered for a portion of its length from the one end toward the opposite end (see Fig. 3) and formed at the large end of the tapered portion are two oppositely arranged and outwardly facing bosses 32 and 33 of unequal length. The bosses 32 and 33 are provided with coaxial bores which open into a chamber or cavity 34 located within the lever 31. A pair of sleeve-type bearings 35 are press-fitted into the coaxial bores in the bosses 32 and 33. A pair of oppositely arranged and inwardly facing bosses 36 and 37, coaxial with the bosses 32 and 33, are formed on the opposite walls of the main casing section 6, and each of these bosses is provided with a bore coaxial with the bores in the bosses 32 and 33. A pin 38 extends through the bosses 36 and 37, bearings 35, chamber 34 and an outwardly facing boss 39 coaxial with the bosses 36 and 37 and formed on the outside wall of the casing section 6 opposite the interior boss 37 to permit rocking of lever 31 about the pin 38. The pin 38 is retained in place by a locking pin 40 which extends through coaxial bores in the pin 38 and boss 39.

The cavity or chamber 34 within the lever 31 is open to the exterior of the casing section 6 by way of a passageway 41 in the pin 38, one end of the passageway opening into the chamber 34 and the other opening at the left-hand end of the pin 38. This opening at the left-hand end of the pin 38 is threaded to receive a threaded plug 42 which may be removed to permit the opening to receive the end of a spout of an oil can from which the cavity or chamber 34 may be filled with a suitable lubricating oil for lubricating certain parts of the brake unit hereinafter described.

The lever 31 has a bore 43 and a coaxial counterbore 44 (see Figs. 2 and 4) the axis of which is disposed at right angles to and beneath the axis of the pin 38. Press fitted into the counterbore 44 and having one end resting against a shoulder 45 formed at the right-hand end of the counterbore 44 is a two-piece split bushing 46. Each half of the bushing 46 is provided with a cavity 47 in the form of a segment of a sphere, the two cavities cooperating to form a seating surface for a member 48, the outer surface of which constitutes a zone of a sphere.

The member 48 is provided with a bore 49, the axis of which is also disposed at right angles to and beneath the axis of the pin 38 and, when in the position shown in Fig. 2, at an acute angle to the axis of the bore 43. Disposed in the bore 49 with a light fit is an internally threaded sleeve member 50 having adjacent its left-hand end, as seen in Fig. 2, a shoulder 51 against which abuts the left-hand end of member 48.

A brake rod 52 threaded at one end, has screw-threaded engagement with the internally threaded sleeve member 50, and at the other end is pivotally connected to one end of the brake head hanger 5 and the brake head 3, as by a bolt 53 and a nut (not shown). The brake hanger 5 comprises two identical parallel links disposed respectively on the opposite sides of a bracket 54 integral with the main casing section 6, and suspended from the bracket 54, as by means of a bolt 55. Suitable antifriction bushings are disposed, as shown in Fig. 3, in a bore in each of the links of the hanger 5. A pair of bushings 56 are disposed in a bore in the bracket 54, the bushings 56 each comprising a metallic inner sleeve to which is bonded a resilient outer sleeve of some suitable material, such as rubber. The bolt 55 is received within the bushings in the links and bracket and is secured against removal from the position in which it is shown in Fig. 3 by a nut 57 and a washer 58. The outer resilient sleeve portion of the bushings 56 allows the brake hanger links to swing sidewise as the brake head 3 and brake shoe 1 are moved laterally the upper side of one resilient sleeve and the lower side of the other resilient sleeve being compressed as the links swing in one direction or the other in response to this lateral movement.

The above-mentioned other end of the brake rod 52 is provided with an angular arm piece 59 formed integral with the brake rod and disposed between two spaced brackets or flanges 60 and 61 formed on and at the back of the brake head 3. Each of the brackets 60 and 61 is provided with a guide slot 62. A bolt 63 extends through the slots 62 in the brackets 60 and 61 and a bore (not shown) in the angular arm piece 59 and is secured in place by a nut (not shown). The slots 62 serve to limit the angular rotation of the brake head 3 about the bolt 53 as the brake shoe 1 is actuated into and out of contact with the tread of the wheel 2 in response to operation of the brake linkage comprising piston 14, piston rod 26, brake lever 31 and brake rod 52. By thus limiting the angular rotation of the brake head 3, the upper end of the brake shoe 1 is prevented from contacting or dragging on the tread of the wheel 2 when a brake application is released.

It is apparent from Fig. 2 that, as the braking surface of the brake shoe 1 wears away, the travel of the brake rod 52 in the direction of the left hand will increase upon each successive application of the brakes. Therefore, in order to maintain the same travel distance for the brake rod 52 and also the piston 14, upon each subsequent application of the brakes as the brake shoe 1 wears away, the brake unit is provided with a slack takeup or adjusting mechanism which will now be described in detail.

The slack adjuster mechanism of the brake unit shown in Figs. 1 and 2, comprises, in addition to the threaded portion of brake rod 52 and the internally threaded sleeve member 50 which has screw-threaded engagement with the threaded portion of the brake rod 52, a ratchet wheel 64, a pawl 65, and a driving mechanism operatively connecting the pawl 65 to the brake lever 31.

The ratchet wheel 64 is keyed to the sleeve member 50 by means of a key 66 which fits into oppositely disposed keyways formed in the sleeve member and the ratchet wheel. The left-hand side of the ratchet wheel 64 is in abutting contact with a shoulder 67 formed on the sleeve member 50 and also with the right-hand end of the member 48. The ratchet wheel 64 is retained in abutting contact with the shoulder 67 and the member 48 by a retaining nut member 68 having screw-threaded engagement with screw threads formed on the right-hand end of the sleeve member 50.

The pawl 65, as shown in Fig. 5, is pivotally mounted intermediate its ends, on a pin 69, which is carried in a pair of spaced-apart jaws 70 formed on a pawl clevis 71. The pawl clevis 71 is in turn pivotally mounted, intermediate its ends, on a pin 72 which is carried in a pair of spaced-apart jaws 73 formed on the lower end of the brake lever 31. As shown in Fig. 5, one end of the pawl 65 is provided with a cam surface 74 and a pawl tip 75. The opposite end of the pawl 65 is provided with a spring seat 76 and disposed between the spring seat 76 and a similar spring seat 77 formed on the pawl clevis 71 is a pawl spring 78 for biasing the pawl 65 in a direction in which the cam surface 74 thereof is in engagement with a tooth 79 on the ratchet wheel 64.

The end of the pawl clevis 71 opposite the end on which the jaws 70 are formed is provided with a spring seat 80 and disposed between the spring seat 80 and a similar spring seat 81 formed on the lower end of the brake lever 31 and on the left-hand side of the jaws 73, as viewed in Fig. 4, is a spring 82 for biasing the pawl clevis 71 in a counterclockwise direction about the pin 72 until a stop 83 formed on the pawl clevis 71 contacts a flat surface 84 formed on the lower end of the lever 31.

As shown in Fig. 2, the left-hand end of the brake rod 52 and the right-hand end of the retaining nut member 68 extend through suitable openings in opposite walls of the main casing section 6 to the exterior thereof. In order to prevent the entrance of water, ice and dirt to the interior of casing section 6, one of a pair of rubber boots 85 surround the opposite openings, respectively, in the main casing section 6. The opposite inturned ends of the left-hand boot 85 are provided with beads which fit, respectively, in a groove formed in the brake rod 52 and in a groove formed in a boss 86 disposed (see Fig. 4) on the left-hand vertical face of the casing section 6. The right-hand boot 85 is also provided with an outer and an inner bead. The outer bead on the right-hand boot 85 fits in a groove formed in a boss 87 disposed on the right-hand vertical face of the casing section 6. The inner bead on the right-hand boot 85 fits in a groove formed in a split ring 88. The split ring 88 in turn fits in a groove machined in the retaining nut member 68 and is provided with an outwardly extending flange 89 which serves to prevent reversal or blowing back of the right-hand boot 85 over the retaining nut member 68 upon an increase in pressure within the main casing section 6 as a result of movement of the piston 14 in the direction of the right hand when a brake application is made.

The right-hand end of the retaining nut member 68 is in the form of a hexagon or a square to receive a wrench so that the sleeve member 50 may be manually rotated to let out slack prior to replacing a worn brake shoe. The retaining nut member 68 is locked to the sleeve member 50 by a cup point set screw 90 to prevent the retaining nut member from rotating relative to the sleeve member when the wrench is applied to the end of the retaining nut member.

In order to provide, in customary fashion, for operation of the brakes by hand brake means, a pair of parallel spaced-apart lugs 91 (Fig. 3) are formed integral with the casing section 6 on the top end thereof, and disposed therebetween and pivotally connected thereto intermediate its ends, as by a pin 92, is a hand brake lever 93. The lower end of the lever 93 is bifurcated to form two fingers 95 which are disposed on the opposite sides of the jaws of a clevis 96 formed on the outer end of the piston rod 26. The fingers 95 are adapted to contact the opposite ends of the pin 30 which extend beyond the jaws of the clevis 96 to permit the lever 93 to be operatively connected to the brake lever 31. The upper end of the hand brake lever 93 may be connected through a cable and a system of pulleys (not shown) to the hand brake wheel which is located at one end of a railway car. A rubber boot 97 surrounds the lever 93 and the lugs 91 to prevent the entrance of foreign matter into the interior of the casing section 6 through the opening formed between the lugs 91.

In order to provide for lubrication of the member 48, a drilled port 98 opens from the bottom of the chamber 34 through the lever 31 and the upper portion of the two-piece split bushing 46 onto the spherical surface of the member 48. The upper end of the port 98 may be enlarged to receive a piece of felt, wicking or other suitable oil absorbing material which acts to prevent a rapid flow of lubricant from the chamber 34 to the spherical surface of the member 48 yet permits a sufficient flow to meet normal lubricational requirements of the member 48.

A sleeve-type spring-pressed detent 99 slidably mounted in a counterbore in an offset portion 100 formed on the brake lever 31 is provided for engaging the teeth on the ratchet wheel 64, to thereby hold the ratchet wheel against reverse rotation in a clockwise direction from each position to which the ratchet wheel is advanced by the pawl 65.

*Operation*

Let it be assumed that the chamber 23 of the brake cylinder casing section 7 is devoid of fluid under pressure and that the springs 15 and 16 have moved the piston 14 to the position in which it is shown in Fig. 2 in which position the lugs 21 on the packing cup 20 contact the pressure head 22.

In operation, when it is desired to effect a brake application, fluid under pressure is admitted to the pressure chamber 23 through the pipe 25 which is connected to the brake controlling valve device of the usual air brake system on railway passenger cars. Fluid under pressure thus supplied to the chamber 23 formed between the piston 14 and the pressure head 22 is effective to move the piston 14 and piston rod 26 in the direction of the right hand against the yielding resistance of the springs 15 and 16. As the piston 14 and rod 26 are moved in the direction of the right hand, the brake lever 31 is rocked clockwise, via the bearings 35, on the pin 38. Since the brake lever 31 is pivotally connected to the brake rod 52 by means of the ball or universal joint formed by the two-piece split bushing 46 and the member 48, clockwise rocking of brake lever 31 is effective to move the brake rod 52 in the direction of the left hand to bring the brake shoe 1 carried by the brake head 3 into braking contact with the wheel 2 to effect a braking action on the wheel 2.

As the brake head 3 and brake shoe 1 are moved as described above, these members are supported and guided by the hanger 5 as this hanger is rocked about the bolt 55 carried by the bushings 56 in the bracket 54. The orientation of the hanger 5, the brake head 3, and brake rod 52 is such that the brake head 3 and brake shoe 1 carried thereby are moved radially toward the wheel 2.

Now let it be assumed that while the brakes are applied, the wheel and axle unit, of which wheel 2 is a part, shifts sidewise or laterally as the result of the variance in the distance between the rails on which the passenger car is traveling and/or the shifting of the weight of the car as the result of the action of the centrifugal force created as the car travels around a curve.

Since the brake shoe 1 is being pressed against the tread of the wheel 2, as the result of the brake application now in effect, the brake shoe 1 and brake head 3 will be shifted sidewise or laterally along the wheel 2 since the ball and socket or universal joint provided by the two-piece split bushing 46 and the member 48 allows the brake rod 52 to swing sidewise or laterally about the center of the ball joint and the outer resilient sleeve portion of the bushings 56 provides for a limited sidewise swinging movement of the brake hanger links as these resilient sleeves are compressible to some extent in response to this sidewise swinging of the links. It should be understood that the universal joint and resilient sleeve portions permit equal lateral movement of the brake shoe 1 and brake head 3 in opposite directions as the wheel and axle unit is shifted in one direction or in the opposite direction.

When it is desired to release the brake application, the fluid under pressure supplied to chamber 23 is vented in the usual manner to atmosphere through the pipe 25 to the brake controlling valve device of the car brake system, whereupon the force of the springs 15 and 16 acting on the non-pressure head 17 move the piston 14 and piston rod 26 in a brake releasing direction to effect counterclockwise rocking of brake lever 31 and the brake head 3 and brake shoe 1 correspondingly away from the tread surface of the wheel 2 to effect a brake release.

In operation, at the same time as the brake lever 31 is rocked in a clockwise direction in order to effect an application of the brakes, the pawl clevis 71, through the intermediary of the pin 72 which is mounted in the spaced jaws 73 formed on the lower end of the brake lever 31, is carried in the direction of the left hand (as viewed in Fig. 2) as pin 72 is rotated clockwise about the pin 38. Since the pin 69 on which the pawl 65 is pivotally mounted is carried in the jaws 70 which are a part of the pawl clevis 71, the above-described movement of the pawl clevis 71 is effective to cause the pawl 65 to move in a downward direction (as viewed in Figs. 3 and 5) so that the lower portion of the cam surface 74 slides downward on the back of the tooth 79 (see Fig. 5) on the ratchet wheel 64, which ratchet wheel is not rotated under these conditions by reason of the fact that it is keyed by means of the key 66 to the sleeve member 50 which is carried by the two-piece split bushing 46 at this time being moved in the direction of the left hand by the brake lever 31. If the brake shoe wear does not exceed a predetermined amount, the cam surface 74 and pawl tip 75 will not be moved downward a sufficient distance for the pawl tip 75 to pass below a tooth 101 and drop into the space between the teeth 79 and 101. Consequently, when the brakes are subsequently released under these conditions, the pawl 65 returns to its original position without effecting rotation of the ratchet wheel 64 since the spring 78 is effective to bias the pawl 65 in a counterclockwise direction about the pin 69 to maintain the cam surface 74 in contact with the back of the tooth 79 along which it slides during a brake application.

If, however, during a brake application, the brake shoe 1 wears away sufficiently for the pawl tip 75 to be moved downward until it passes below the outer end of the tooth 101 on the ratchet wheel 64, it will drop into the space between the teeth 79 and 101. With the pawl tip 75 in this position, the pawl 65 will be effective to rotate the ratchet wheel 64 and sleeve member 50 upon a subsequent release of the brakes. Rotation of brake rod 52 is prevented by its connection to the brake head 3 and hanger 5. Consequently, the screw-threaded sleeve member 50 is unscrewed from the screw-threaded portion of the brake rod 52, thus moving the brake shoe 1 in the direction of the wheel 2 and taking up the slack occurring as a result of the wearing away of the brake shoe 1.

From the above, it is apparent that as the brake shoe 1 wears away, the brake rod 52, and consequently the brake shoe 1, are moved radially and at a slight angle to the horizontal in the direction of the wheel 2 to always maintain a substantially uniform clearance between the tread of the wheel 2 and the braking surface of the brake shoe 1 when the brake shoe occupies its brake release position.

When the brake shoe 1 has completely worn out and it is to be replaced with a new shoe, it is necessary to reduce the length of brake rod 52 since the thickness of the new brake shoe is greater than that of the worn shoe. The length of brake rod 52 may be reduced by applying a wrench to the hexagon or square head on the retaining nut member 68 and manually rotating the retaining nut member 68 and sleeve member 50 clockwise, as viewed in Figs. 3 and 5, until the length of the brake rod 52 has been reduced the required amount.

It should be noted that, as heretofore well known in slack adjusting mechanisms, the pawl 65 and its cam surface 74 are of such shape and size that, incidental to a release of the brakes, this cam surface, which is in contact with tooth 79 (Fig. 5) on the ratchet wheel 64, is effective, as the pawl 65 continues its upward movement to its release position and prior to the pawl reaching its normal or release position corresponding to the brake release position of the brake shoe 1, to so limit the counterclockwise rocking of the pawl 65 about the pin 69, as viewed in Figs. 3 and 5, such that, upon the pawl reaching its release position, the pawl tip 75 will have been moved to a position in which the ratchet wheel 64 is free to rotate in a clockwise direction when the sleeve member 50 and retaining nut member 68 are manually rotated in a clockwise direction by a wrench applied to the hexagon or square end of the retaining nut member.

Having now described the invention, what I claim as new and desire to secure by Letters Patent is:

1. A brake unit for applying a braking force to a railway car wheel, said unit comprising a casing fixed with respect to the car truck frame and having a chamber therein and having one wall with an opening therein, a casing section mounted on said one wall of said casing over the opening therein and having a bore registering with said opening, a piston operative in said bore and movable in opposite directions responsively to supply and release of pneumatic pressure to and from one side thereof, a brake lever disposed entirely within and rockably mounted on said casing, means operatively connecting one end of said lever to said piston, a brake shoe, a brake head carrying said shoe, a brake hanger pivotally mounted at its one end on said casing and pivotally connected at its other end in supporting relation to said brake head, a rigid rod member pivotally connected at one end to the brake head and extending through one wall of the casing into said chamber, and ball and socket means connecting the other end of said brake lever to the portion of said rod member within said chamber whereby movement of the brake shoe into and out of braking contact with the tread surface of the car wheel is effected responsively to supply of pneumatic pressure to and release of pneumatic pressure from the one side of said piston, respectively, said ball and socket means providing for limited lateral movement of said rigid rod member to enable said shoe to move laterally with respect to said casing simultaneously with said car wheel.

2. A brake unit as defined in claim 1, further characterized in that the ball and socket means comprises two parts one of which is a socket member carried by said lever and the other of which is a ball member mounted on said rigid rod member.

3. A brake unit as defined in claim 1, further characterized in that the ball and socket means comprises two parts one of which is a socket member carried by said lever and the other of which is a ball member mounted on said rigid rod member, and further comprising means for supplying a lubricant to the rubbing surface between said socket member and said ball member.

4. A brake unit as defined in claim 1, further characterized in that the ball and socket means comprises two parts one of which is a socket member carried by said lever and the other of which is a ball member mounted on said rigid rod member, and further including resilient supporting means by which said brake hanger is pivotally mounted at its one end on said casing, said resilient means enabling limited sidewise swinging of said hanger incidental to lateral movement of said rigid rod member.

5. A brake unit as defined in claim 1, further characterized in that the rigid rod member comprises two parts one of which is a non-rotative screw member connected to the brake head and the other of which is an internally threaded rotative sleeve member in which the screw member is received, and further including means comprising a ratchet wheel mounted on said sleeve, and a pawl member carried on said brake lever and operated by the rocking of said brake lever for effecting rotational movement of said wheel and thereby said sleeve member relative to said screw member.

6. A brake unit as defined in claim 1, further characterized in that the rigid rod member comprises two parts one of which is a non-rotative screw member connected to the brake head and the other of which is an internally threaded rotative sleeve member in which the screw member is received, and further including a ratchet wheel mounted on said sleeve, a key connecting said wheel to said sleeve, a pawl operating member pivotally mounted on and operated by said brake lever, and a pawl pivotally mounted on said pawl operating member for effecting rotational movement of said ratchet wheel and thereby said sleeve member relative to said screw member.

7. A brake unit as defined in claim 1, further characterized in that said rigid rod member comprises two parts, one of which is a non-rotative screw connected to the brake head and the other of which is an internally threaded rotative sleeve in which the screw is received, and in that the ball and socket means connects said brake lever to the sleeve of said rigid rod member and comprises a ball fixed to the sleeve of said rigid rod member and a socket fitted in one end of said brake lever, and further including slack take-up means comprising a ratchet wheel fixed on said sleeve and an operating mechanism for rotating said ratchet wheel and sleeve, said mechanism being carried entirely on said brake lever and operated thereby so as to cause rotation of the ratchet wheel and sleeve only in response to the rocking of said brake lever through an angle greater than a chosen angle.

8. A brake unit as defined in claim 1, further characterized in that the rigid rod member comprises two parts one of which is a non-rotative screw-threaded member connected to the brake head and the other of which is an internally threaded rotative sleeve member in which the screw-threaded member is received, and further including a pawl clevis pivoted on and rockable by said lever, a ratchet wheel attached to said sleeve member for rotating said sleeve member on said screw member, a pawl member pivotally mounted on said pawl clevis, and biasing means carried by said pawl clevis for biasing said pawl clevis in the direction of said lever and said pawl member in the direction of said ratchet wheel to effect ratcheting of said pawl member over one tooth on said ratchet wheel upon the rocking of said lever in one direction through greater than a certain angle as a result of brake shoe wear and to effect subsequent rotation of said ratchet wheel through said pawl member upon rocking of said lever in the opposite direction.

9. A brake unit as defined in claim 1, further characterized in that the rigid rod member comprises two parts one of which is a non-rotative screw-threaded member connected to the brake head and the other of which is an internally threaded rotative sleeve member in which the screw-threaded member is received, and further including a pair of spaced-apart lugs carried on the other end of said brake lever, a pin carried by said lug, a pawl operating lever pivotally mounted on said pin and having a stop for limiting the rotation thereof in one direction with respect to said other end of said brake lever, a ratchet wheel attached to said sleeve member for rotating said sleeve member on said screw member, a pawl member pivotally mounted on said pawl operating lever, a first biasing means disposed between said other end of said brake lever and said pawl operating lever for biasing the stop on said operating lever in the direction of said other end of said brake lever, and a second biasing means disposed between pawl member and said pawl operating lever for biasing said pawl member in the direction of said ratchet wheel to effect ratcheting of said pawl member over one tooth on said ratchet wheel upon the movement in one direction of said pawl operating lever by said brake lever exceeding a chosen amount as a result of brake shoe wear and to effect subsequent rotation of said ratchet wheel through said pawl member upon movement in an opposite direction of said pawl operating lever by said brake lever.

10. A brake unit as claimed in claim 1, further characterized in that said casing has a second opening in a second wall thereof, and further including a second lever pivotally mounted on said casing intermediate its end with one arm extending through said second opening into said chamber and being effective upon manual application of force to the other arm thereof external to said casing in one direction only to rock said brake lever in a brake applying direction, the rocking of said second lever being independent of the rocking of said brake lever by said piston.

11. A brake unit for applying a braking force to a railway car wheel, said unit comprising a casing having a chamber therein and having a first and a second wall each with an opening therein and arranged at right angles to the other wall, a casing section mounted on said first wall of said casing over the opening therein and having a bore registering with the opening, a piston operative in said bore and movable in opposite directions responsively to supply and release of pneumatic pressure to and from one side thereof, a first pin carried by said casing, a first lever disposed entirely within and rockably mounted on said first pin, an elongated pin operably connecting one end of said first lever to said piston, a brake shoe, a brake head carrying said shoe, a hollow resilient bushing carried by said casing, a second pin disposed in said bushing and having its opposite ends extending from the opposite ends of said bushing, a brake hanger comprising two parallel links each mounted at its one end on one end of said pin and pivotally connected at its other end in supporting relation to said brake head, a rigid rod member pivotally connected at one end to the brake head and extending through one wall of the casing into said chamber, a pair of lugs mounted on said second wall on opposite sides of the opening therein, a second lever bifurcated at one end disposed between and rockably mounted intermediate its ends on said pair of lugs, said bifurcated end being so disposed as to contact the opposite ends of said elongated pin upon the rocking of said second lever in one direction and to permit rocking of said first lever by said piston without effecting rocking thereof, and a ball and socket means connecting the other end of said first lever to the portion of said rigid rod member within said chamber whereby movement of the brake shoe into and out of braking contact with the tread surface of the car wheel is effected responsively either to the supply of pneumatic pressure to and release of pneumatic pressure from the one side of said piston respectively or to manual rocking of said second lever in said one direction and in an opposite direction and whereby lateral movement of the brake shoe in either direction is effected so long as a brake application is in effect in response to lateral movement of the car wheel in either direction.

12. A brake unit as defined in claim 10, further characterized in that a lubricant containing chamber is so disposed in said first lever as to provide a supply of lubricant for lubricating said first pin and said ball and socket means, and further including a passageway in said first pin through which lubricant may be supplied to said chamber for filling said chamber.

References Cited in the file of this patent

UNITED STATES PATENTS

| | | |
|---|---|---|
| 2,561,454 | Williams | July 24, 1951 |
| 2,812,042 | Runken | Nov. 5, 1957 |
| 2,833,381 | Frola et al. | May 6, 1958 |
| 2,889,014 | Goetz | June 2, 1959 |